Dec. 23, 1941.   C. C. NUGENT   2,267,338
TRUCK CAR
Filed March 26, 1940   2 Sheets-Sheet 1
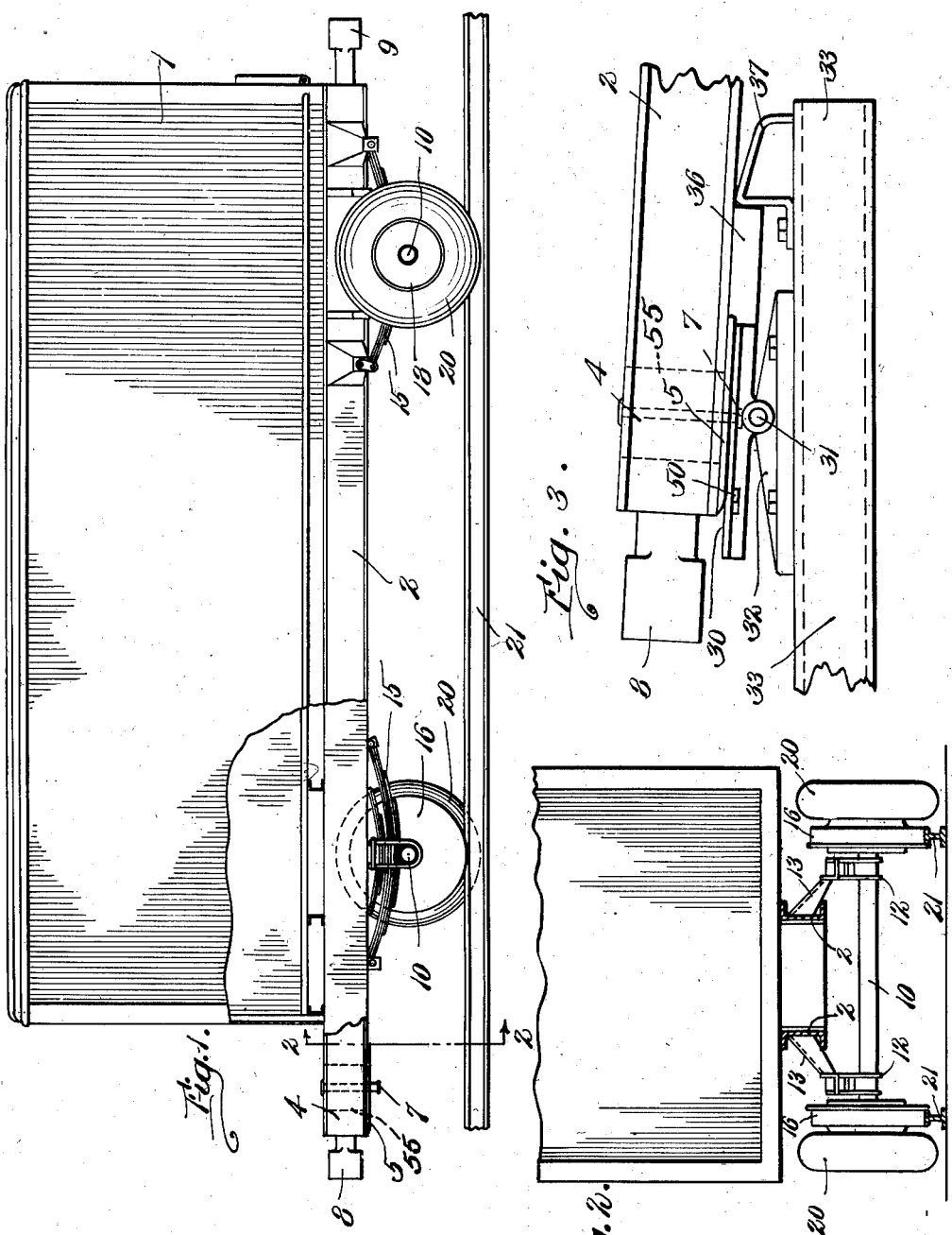

Dec. 23, 1941.　　　C. C. NUGENT　　　2,267,338
TRUCK CAR
Filed March 26, 1940　　　2 Sheets-Sheet 2
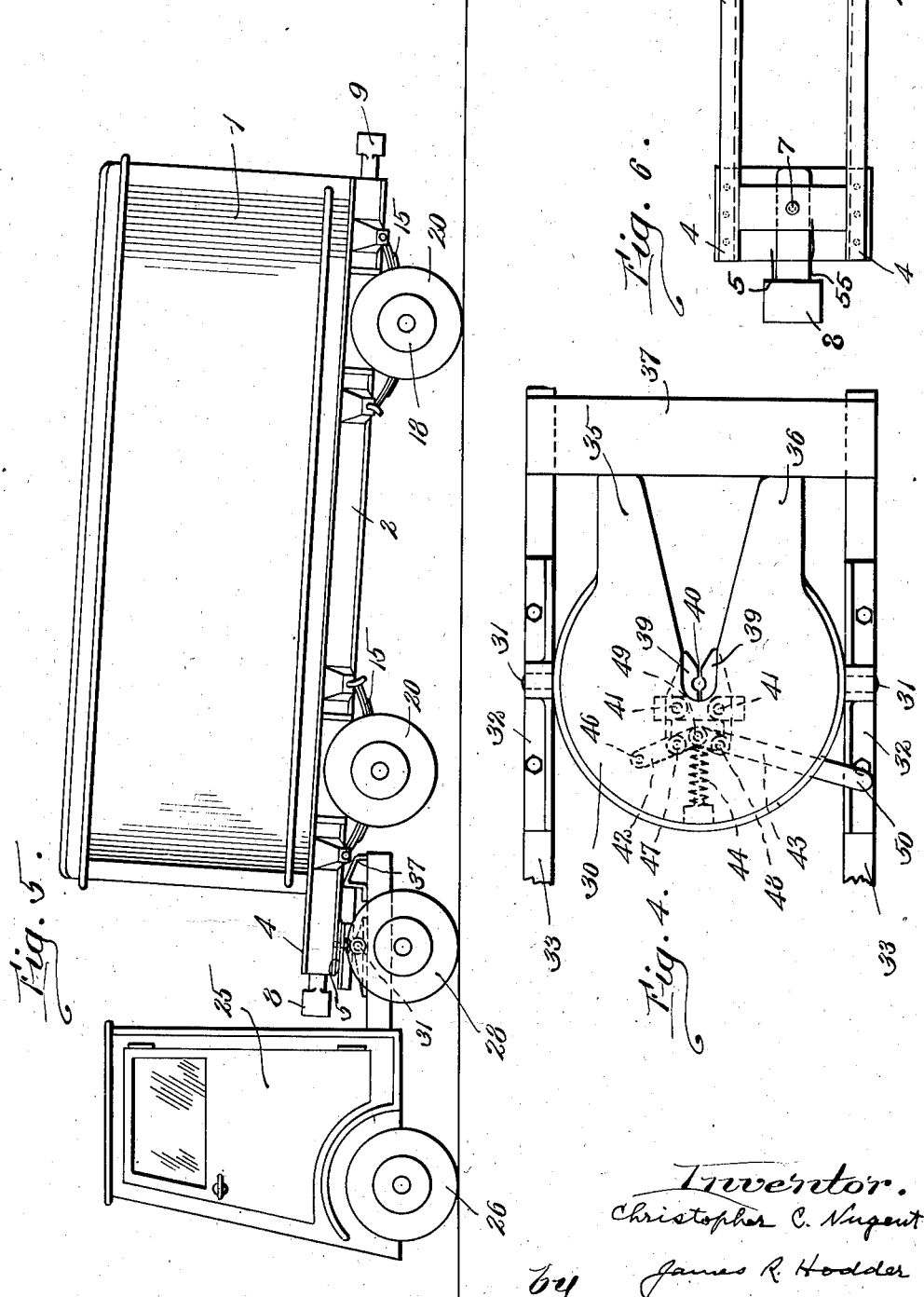

Patented Dec. 23, 1941

2,267,338

UNITED STATES PATENT OFFICE 2,267,338

TRUCK CAR

Christopher C. Nugent, Winthrop, Mass.

Application March 26, 1940, Serial No. 326,031

4 Claims. (Cl. 105—215)

My present invention is a novel and improved type of truck car designed for use either as a road vehicle in the form of a semi-trailer, or a car to travel on railroad tracks, to be interchangeable at will, and without shifting or moving either the truck wheels or rail wheels, and suitable for cooperation in any standard type of road tractor for road travel.

Heretofore various efforts have been made to provide a vehicle which could be interchangeably employed either on a railroad track or on a roadway to obtain the advantages incident to conversion from road to train-track travel, and thus obtain the advantages of any transportation on a track as a part of a railroad train, together with individual transportation on a highway to enable the same to "pick up and deliver" goods without transfer from truck to train, and vice versa.

All such prior attempts, however, to carry out these desirable features have been impractical, expensive, or unsatisfactory and have usually required a shifting of vehicle wheels or other parts when the transition from track to road-vehicle or from road-vehicle to tracks was necessary.

In my present invention I have developed a vehicle for this purpose, for which I have coined the phrase "truck car," which can be almost instantly transformed from either track-travel in a train, or vice-versa, without any constructive changes, additions, or replacements.

I accomplish this desired result by providing a permanent, fixed, combined fifth wheel for the truck car attachment, and coupling member for the train attachment, whereby my improved truck car is automatically fitted for attachment to a road truck as a semi-trailer and is suitable for traveling on railroad tracks without any other change or operation than the simple process of deflating the truck tires when on tracks, or inflating them for road travel.

The actual coupling operation is effected automatically by backing the tractor with lower floating fifth wheel into and under the tractor end of the truck car, thereby lifting the tractor end of the truck car, engaging the permanent upper fifth wheel of the truck car together with the permanent king pin fixed therein, and thus locking the tractor and truck car in coupled position. The frame portion carrying the fixed fifth wheel and king pin is extended to have a standard type of railroad train coupling device at the forward end. A similar train coupling is positioned at the after end of my truck car, as both couplings are necessary when the truck car is on its flanged wheels on the tracks; whereas only one fifth wheel and king pin for attachment to the auto tractor is necessary when my truck car is on its vehicle tires for traveling on a roadway.

The truck car can have each end fitted both with the permanent fifth wheel bearing and fixed king pin, together with a train coupling, thus making the ends interchangeable if desired. The important feature of a fixed or permanent upper fifth wheel bearing in combination with a fixed and permanent king pin therein, and in association with the adjacent train coupling, constitutes important features of my invention.

Referring to the drawings illustrating a preferred embodiment of my present invention, Fig. 1 is a side view of my novel type of truck car with a portion broken away to illustrate same when mounted on a railroad track, with the flanged wheels in contact therewith;

Fig. 2 is a partial front view of the truck car shown in Fig. 1 on the line 2—2;

Fig. 3 is an enlarged fragmentary side view illustrating the coupling of my improved truck car with its fixed fifth wheel in contact with the fifth wheel bearing and coupling connection on a standard type of tractor adapted to be coupled with and draw a semi-trailer;

Fig. 4 is a plan view of the tractor coupling shown in Fig. 3, and

Fig. 5 is a diagrammatic view illustrating my truck car coupled as a semi-trailer to a motor tractor, and Fig. 6 is a fragmentary plan view of my truck car with combined fixed fifth wheel, rigid king pin, and railway coupling.

As shown in the drawings, I provide any suitable type, size, length, width, and height of vehicle body, as designated at 1, for the particular truck car desired, mounting same on suitable longitudinal frames 2—2 extending lengthwise of the truck body 1, and with one end of said frame, or other structure on which the truck car is built, extended as shown at 4 and provided on the lower surface with a fixed fifth wheel 5, a permanent king pin 7 for attachment to the motor tractor, and a railroad train coupling device 8. The coupling device 8 is shown diagrammatically in the drawings and may be of any desired type. It is supported within the extension 4 of the frame structure and the fixed fifth wheel 5 is secured to the underside of said extension. By this positioning of the coupling and the fifth wheel they may be selectively used without one interfering with the other.

A corresponding train coupling device 9 is fitted at the other end of the framework, and while I could have a similar fixed fifth wheel and king pin at the same end, it is only necessary to have this arrangement at one end for coupling with the motor tractor. Near each end of the truck frame, I provide axles 10 mounted in suitable bearings 12—12 connected by brackets 13—13 to the truck car frame, thru springs shown diagrammatically at 15, which springs, in turn, are suitably attached to the frame 2—2. On opposite ends of the axle 10 are fitted flanged railroad wheels 16—16 of suitable gauge for the tracks with which the truck is designed to be used. Normally a standard gauge, so called, although of course narrow gauge or other spaced railroad tracks, can be correspondingly fitted. Outside of each flanged wheel 16 is detachably secured in any suitable manner a vehicle wheel 18, having a tire 20 thereon, preferably of substantially greater diameter than that of the flanged wheels 16 but insufficient to touch ordinarily the ties on which the railroad tracks 21 are mounted.

Furthermore, when my truck car is run over a roadway or platform on to the railroad tracks 21, the tires 20 are then deflated so that the same will readily pass over switches, frogs, and railroad crossings without any lifting action on the truck so that the truck itself is entirely borne by the flanged railroad wheels 16.

Thus, the tires on the truck wheels when inflated are of greater diameter than that of the railroad wheels, but the truck tires are adapted to become of lesser diameter than the railroad wheels by simply deflating them, so that they will readily run over switches and crossings.

Conversely, when the truck car has reached the station where it is desired to debark the same from the rails, then the tires 20 are simply inflated and a ramp adjacent the rails 21 can be provided on which the tire wheels 20 will run and pick up the load of the truck car; whereupon it can be transported as a road vehicle in the form of a trailer with fixed axles and nonpivotal wheels or/and, preferably, as a semi-trailer attached to a motor tractor.

With the fixed upper fifth wheel and bearing 5, permanent king pin 7, and railroad coupling 8 all mounted conveniently in the forward extension 4 of the frames on which the car is secured, I am thus enabled to utilize my truck car as a semi-trailer by the operation of backing in a motor tractor, designated diagrammatically at 25, having the usual front steering wheels 26 and rear driving wheels 28, fitted under the tractor fifth wheel or bearing 30.

This latter may be of any convenient or standard type or form, being herein illustrated in Figs. 3 and 4 as comprising a usual oscillating member 30 mounted on trunnions 31, fitted in suitable bearings on brackets 32 secured to the side frames 33—33 of the motor truck tractor 25. This member 30 has a rearwardly extending ramp portion divided into two sections 35 and 36 adjacent and abutting on a bevelled apron 37 extending across the side frames and upon which the fixed fifth wheel bearing 5 of my truck car will be lifted or raised as the motor truck 25 is backed underneath the truck car to effect the coupling or hitch for road transportation. Preferably, the permanent king pin 7 is fixed into and thru the upper rigid fifth wheel and bearing 5, and also in a cross-brace 55 between the side frames to take the strain both of the fifth wheel bearing 5 and the king pin 7, as best shown in Fig. 6. The train coupling 8 may also be attached to this cross-brace if desired, or in any other suitable manner. The forward end of the frame and member 5 are rounded as best shown in Figs. 3 and 5 to facilitate sliding on to the member 30.

The king pin 7 will be guided into the coupling of the motor tractor thru the side bearings of the ramp portions 35 and 36 until the king pin is locked in a latch, shown here as consisting of a pair of members 39, having an opening 40 to receive the king pin 7, which latch members are pivoted at 41—41 underneath the member 30 and are held in locking position by toggles 42 and 43 actuated by a spring 44, the toggle arm 42 being mounted on a pivot 46, and with one latch 39 having its rearward portion pivoted at 47 to the toggle arm 42, and the other latch 39 being pivoted at 48 to the toggle member 43, said toggle members being, in turn, pivoted together at 49, or, as clearly shown in Fig. 4.

The toggle arm 43 is extended outwardly into a handle portion 50 adjacent the side of the tractor so that the attendant can operate the toggle arms against the tension of the spring 44, thus opening the latches 39 and releasing the king pin 7 when it is desired to uncouple the tractor from my truck car.

It will thus be seen that my present invention enables such a truck car to be instantly and automatically adapted either for railroad transportation on tracks as a unit in a train, or as a trailer or semi-trailer suitable for traveling on streets and roadways without additions, attachments, or other mechanical work involved in fitting the car for either service, and the only operation necessary is to deflate or inflate the tires. Thus my truck car is at all times ready for instant interchangeability independent of skilled labor.

I claim:

1. In a vehicle adapted for railroad travel and as a semi-trailer for highway travel and having a body, a supporting frame therefor, rail wheels and road wheels carried thereby and adapted selectively for use, the combination of a railroad coupling means mounted in an extension of the frame and a motor tractor coupling means secured to the underside of said frame, both of said coupling means being at all times permanently fixed in operative position for selective use whereby said truck car is ready instantly for use as a unit in a train on railroad tracks or as a highway semi-trailer.

2. A vehicle of the kind described, adapted for railroad travel and as a semi-trailer for highway travel, comprising sets of non-rotatable axles, each having flanged rail wheels thereon adapted to fit a railroad gage on which the vehicle is to travel, highway wheels also secured to said axles outside the rail wheels, a frame extension at the end of the vehicle, having in combination a fixed upper fifth wheel on the underneath part of said frame, and a permanent king pin associated therewith for coupling a motor tractor for highway travel, together with a railroad train coupling for railroad travel, which coupling is secured to said train and disposed above said upper fifth wheel, both the fifth wheel coupling and the train coupling being permanently fixed in operative position and interchangeable for either rail or highway travel independently of mechanical changes.

3. A truck car of the kind described comprising a truck body, a chassis in which said body is mounted, non-rotatable axles carried by said chassis adjacent each end of the body and each axle carrying a pair of rail wheels spaced for railroad travel, and automobile wheels and tires thereon outside said rail wheels, the tires of the automobile wheels being of greater diameter when inflated than that of the flanged rail wheels, said automobile wheels when the tires are deflated adapted to become of less diameter than said rail wheels, said chassis having combined railroad coupling and motor tractor coupling means at an end, both of said coupling means being at all times in permanently fixed operative position for selected use whereby said truck car is ready instantly for use as a unit in a train on railroad tracks, or as a highway semi-trailer independently of mechanical changes.

4. The combination of an auto highway motor vehicle, having a rearwardly positioned coupling attachment for a semi-trailer, adapted to bear the weight of the forward portion of said semi-trailer, together with a truck car comprising a vehicle body mounted on a chassis, axles secured to said chassis adjacent each end thereof and each axle having a pair of flanged wheels for rail travel, and a pair of vehicle wheels positioned outside said rail wheels for highway travel, the vehicle wheels including tires of greater diameter than the rail wheels when the tires are inflated, and adapted to become of less diameter than the rail wheels when the tires are deflated, said chassis comprising at an end a fixed upper fifth wheel with a permanent king pin for attachment to said motor vehicle, together with an extension beyond said fixed upper fifth wheel carrying a railroad coupling, said railroad coupling being disposed above said fixed upper fifth wheel, both the fifth wheel coupling and the train coupling being permanently fixed in operative position and interchangeable for rail or highway travel independently of mechanical changes.

CHRISTOPHER C. NUGENT.